United States Patent
Li et al.

(10) Patent No.: US 10,736,148 B2
(45) Date of Patent: Aug. 4, 2020

(54) RANDOM ACCESS METHOD, RANDOM ACCESS DEVICE, AND TERMINAL

(71) Applicant: Yulong Computer Telecommunication Scientific (Shenzhen) Co., Ltd., Guangdong (CN)

(72) Inventors: Mingju Li, Guangdong (CN); Yajun Zhu, Guangdong (CN); Yunfei Zhang, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/068,655

(22) PCT Filed: Jul. 30, 2016

(86) PCT No.: PCT/CN2016/092469
§ 371 (c)(1),
(2) Date: Jul. 6, 2018

(87) PCT Pub. No.: WO2017/117990
PCT Pub. Date: Jul. 13, 2017

(65) Prior Publication Data
US 2019/0029054 A1 Jan. 24, 2019

(30) Foreign Application Priority Data
Jan. 8, 2016 (CN) .................... 2016 1 0014620

(51) Int. Cl.
*H04W 74/08* (2009.01)
*H04W 74/00* (2009.01)
*H04W 16/14* (2009.01)

(52) U.S. Cl.
CPC ....... *H04W 74/0833* (2013.01); *H04W 16/14* (2013.01); *H04W 74/004* (2013.01);
(Continued)

(58) Field of Classification Search
CPC ..... H04W 16/14–16; H04W 24/02–04; H04W 36/0005; H04W 36/0055–0077; H04W 48/02–20; H04W 74/002–0891
See application file for complete search history.

(56) References Cited

U.S. PATENT DOCUMENTS

| 2015/0057011 A1* | 2/2015 | Di Girolamo .... H04W 74/0808 455/454 |
| 2015/0326995 A1 | 11/2015 | Li et al. |

(Continued)

FOREIGN PATENT DOCUMENTS

| CN | 101203029 A | 6/2008 |
| CN | 104363599 A | 2/2015 |

(Continued)

OTHER PUBLICATIONS

International Search Report dated Oct. 27, 2016 in connection with Application No. PCT/CN2016/092469.
(Continued)

*Primary Examiner* — Timothy J Weidner
(74) *Attorney, Agent, or Firm* — Wolf, Greenfield & Sacks, P.C.

(57) ABSTRACT

A random access method, device, and terminal for an LTE system operating on an unlicensed frequency band. The method comprises: determining a format of a random access preamble sequence; determining, according to the format of the random access preamble sequence, a channel detection mode for a random access channel; performing, according to the determined channel detection mode, detection on the random access channel; and upon detection of the random access channel being in an idle state, sending the random access preamble sequence via the random access channel.

18 Claims, 2 Drawing Sheets

(52) U.S. Cl.
CPC ....... *H04W 74/006* (2013.01); *H04W 74/008* (2013.01); *H04W 74/08* (2013.01); *H04W 74/085* (2013.01); *H04W 74/0858* (2013.01); *H04W 74/0875* (2013.01)

(56) References Cited

U.S. PATENT DOCUMENTS

| | | | |
|---|---|---|---|
| 2016/0021681 A1* | 1/2016 | Nan ................. | H04W 74/0866 370/329 |
| 2016/0295609 A1* | 10/2016 | Vajapeyam ....... | H04W 74/0833 370/252 |
| 2018/0255586 A1* | 9/2018 | Einhaus ............ | H04W 74/0833 370/329 |
| 2019/0116010 A1* | 4/2019 | Li ..................... | H04W 74/0833 370/329 |
| 2019/0116614 A1* | 4/2019 | Li ..................... | H04W 74/0833 370/329 |
| 2019/0215864 A1* | 7/2019 | Yang ................. | H04W 74/0833 370/329 |

FOREIGN PATENT DOCUMENTS

| | | |
|---|---|---|
| CN | 104735729 A | 6/2015 |
| CN | 105072690 A | 11/2015 |
| CN | 105472762 A | 4/2016 |
| EP | 2 809 124 A1 | 12/2014 |
| WO | WO 2015/187565 A1 | 12/2015 |

OTHER PUBLICATIONS

Extended European Search Report for European Application No. 16883124.6 dated Nov. 20, 2018.

[No Author Listed], Discussion on PRACH for eLAA. 3GPP TSG RAN WG1 Meeting #85. Coolpad. May 2016. 3 pages. URL:http://www.3gpp.org/ftp/tsg_ran_WG1_RL1/TSGR1_85/Docs [retrieved on May 13, 2016].

[No Author Listed], PRACH design for Rel-14 eLAA. 3GPP TSG RAN WG1 Meeting #85. CATT. May 2016. 4 pages. URL:http://www.3gpp.org/ftp/tsg_ran_WG1_RL1/TSGR1_85/Docs [retrieved on May 14, 2016].

[No Author Listed], PRACH Transmission for eLAA. 3GPP TSG RAN WG1 Meeting #85. Intel Corporation. May 2016. 5 pages. URL:http://www.3gpp.org/ftp/tsg_ran/WG1_RL1/TSGR1_85/Docs [retrieved on May 14, 2016].

* cited by examiner

RANDOM ACCESS METHOD, RANDOM ACCESS DEVICE, AND TERMINAL

CROSS-REFERENCE TO RELATED APPLICATIONS

This application is a national stage filing under 35 U.S.C. § 371 of international application number PCT/CN2016/092469, filed Jul. 30, 2016, entitled "RANDOM ACCESS METHOD, RANDOM ACCESS DEVICE, AND TERMINAL", which claims priority to Chinese Patent Application No. 201610014620.X filed on Jan. 8, 2016 and entitled "RANDOM ACCESS METHOD, RANDOM ACCESS DEVICE, AND TERMINAL", the disclosures of which are herein incorporated by reference in their entirety.

TECHNICAL FIELD

The present disclosure relates to the field of communication technologies, and relates to a random access method, device, and terminal in a case where an LTE system operates on an unlicensed frequency band, for example.

BACKGROUND

A 3rd Generation Partnership Project (3GPP) proposes a concept of Licensed-Assisted Access (LAA) to use unlicensed spectrum with help of Long Term Evolution (LTE) licensed spectrum. Access technologies used on the unlicensed spectrum in related technologies, such as Wi-Fi, have weaker anti-interference capabilities. In order to avoid interference, many anti-interference rules have been designed in a Wi-Fi system. In an LTE network, since there is a good orthogonality which guarantees an interference level, it is not needed to consider in uplink and downlink transmission between a base station and a user whether there are other base stations or other users in a surrounding area which are transmitting data. If it is not considered whether other devices in the surrounding area are using an unlicensed frequency band when the LTE is used on the unlicensed frequency band, this will cause great interference to Wi-Fi devices. Since the LTE would transmit data once there is a service, and there is no monitoring rule, the Wi-Fi devices cannot transmit data when there is service transmission in the LTE and need to wait until the service transmission in the LTE is completed, and then can perform data transmission when a channel is detected in an idle state.

Traditionally, Physical Random Access Channel (PRACH) resource allocation of Time Division Duplexing (TDD) is as follows:

1. there are five formats of random access preamble sequences, i.e., preamble:
   (1) format 0: occupy 1 ms;
   (2) format 1: occupy 2 ms;
   (3) format 2: occupy 2 ms;
   (4) format 3: occupy 3 ms;
   (5) format 4: occupies less than 1 ms and only occupies a Uplink Pilot Time Slot (UpPTS).

Detailed information of the above five formats is shown in Table 1:

TABLE 1

| Format of Random Access Preamble Sequence | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

TABLE 1-continued

2. Each PRACH occupies contiguous six Resource Blocks (RBs) in frequency and is located between a Physical Uplink Control Channel (PUCCH) and a Physical Uplink Shared Channel (PUSCH).

Meanwhile, in a conventional case, PRACH transmission does not require channel detection. However, in an LAA TDD system, since there is interference to other systems such as Wi-Fi systems, it needs to solve the technology problems whether a channel detection is necessary to perform before a User Equipment (UE) transmits the random access preamble sequences, and whether different channel detection mechanisms need to be used for different formats of the random access preamble sequences.

SUMMARY

The present disclosure provides a novel random access scheme for an LTE system operating on an unlicensed frequency band, which can prevent the LTE system operating on the unlicensed frequency band, from interfering with other systems (such as a Wi-Fi system) operating on the unlicensed frequency bands, and can ensure fairness for occupation of the random access channel when the different formats of random access preamble sequences are used.

In view of this, in a first aspect, it provides a random access method for an LTE system operating on an unlicensed frequency band, which includes: determining a format of a random access preamble sequence; determining a channel detection mode for a random access channel according to the format of the random access preamble sequence; detecting the random access channel according to the determined channel detection mode; and transmitting the random access preamble sequence via the random access channel when it is detected that the random access channel is in an idle state.

In this technical solution, since occupied time lengths are different for different formats of the random access preamble sequences, the channel detection mode is determined according to the format of the random access preamble sequence to detect the random access channel, so that the different channel detection modes can be used for the different formats of the random access preamble sequences, thereby ensuring a fairness for occupation of the random access channel when the different formats of the random access preamble sequences are used. Furthermore, a channel detection is also performed while the random access preamble sequence is transmitted, thereby preventing the LTE system operating on the unlicensed frequency bands, from interfering with other systems (such as a Wi-Fi systems) operating on the unlicensed frequency bands.

In the above technical solution, optionally, the format of the random access preamble sequence includes: a format 0, a format 1, a format 2, a format 3, and a format 4. A priority of the channel detection mode corresponding to the format 4>a priority of the channel detection mode corresponding to the format 0>a priority of the channel detection mode corresponding to the format 1=a priority of the channel detection mode corresponding to the format 2>a priority of the channel detection mode corresponding to the format 3, with the priority of the channel detection mode representing a difficulty level for occupation of the random access channel by a terminal and/or a time length for occupation of the random access channel by the terminal. The higher priority of the channel detection mode represents the easier occupation of the random access channel by the terminal and/or the shorter time length for the occupation of the random access channel by the terminal.

Optionally, as for the five formats of the random access preamble sequences, the size relationship thereof with respect to time lengths during which random channels are occupied by the terminal is: the format 4<the format 0<the format 1=the format 2<the format 3. It can be seen that in the format 4 of the random access preamble sequence, the time length during which the random access channel is occupied by the terminal is shortest. Therefore, to ensure the fairness for occupation of the channels in different formats, a channel detection mode corresponding to the format 4 has the highest priority, followed by a channel detection mode corresponding to the format 0, and followed by channel detection modes corresponding to the format 1 and the format 2, and followed by a channel detection mode corresponding to the format 3.

Based on the above solution, the channel detection modes for different formats proposed by the present disclosure are as follows.

In any of the foregoing technical solutions, optionally, the step of determining the channel detection mode for the random access channel according to the format of the random access preamble sequence includes: determining, if the format of the random access preamble sequence is the format 4, that the channel detection mode is not to perform a channel detection, and/or a maximum time length for occupation of the random access channel is two symbol lengths or 1 ms; or performing, if the format of the random access preamble sequence is the format 4, a channel detection process for a predetermined time length, and the predetermined time length is 16 us+M×9 us, wherein M=1 or 2, and/or a maximum time length for occupation of the random access channel is two symbol lengths or 1 ms.

In any of the foregoing technical solutions, optionally, the step of determining the channel detection mode for the random access channel according to the format of the random access preamble sequence includes: determining, if the format of the random access preamble sequence is a format 0, that the channel detection mode is not to perform a channel detection, and/or a maximum time length for occupation of the random access channel is 1 ms; or performing, if the format of the random access preamble sequence is a format 0, a channel detection process for a predetermined time length, and the predetermined time length is 16 us+M×9 us, wherein M=1 or 2, and/or a maximum time length for occupation of the random access channel is 1 ms.

In any of the foregoing technical solutions, optionally, the step of determining the channel detection mode for the random access channel according to the format of the random access preamble sequence includes: determining, if the format of the random access preamble sequence is a format 1 or a format 2, that a maximum time length for occupation of the random access channel is 2 ms, and/or performing a channel detection process by using the following parameters: a value range of a contention window being 3 to 7, and a time length of an extended period being 16 us+M×9 us, wherein M=1 or 2.

In any of the foregoing technical solutions, optionally, the step of determining the channel detection mode for the random access channel according to the format of the random access preamble sequence includes: determining, if the format of the random access preamble sequence is a format 3, that a maximum time length for occupation of the random access channel is 3 ms, and/or performing a channel detection process by using the following parameters: a value range of a contention window being 7 to 15, and a time length of an extended period being 16 us+M×9 us, wherein M=1 or 2.

In any of the foregoing technical solutions, optionally, when the format of the random access preamble sequence is the format 1, the format 2 or the format 3, the process of the channel detection through the contention window and the extended period is a category 4 Listen Before Talk (LBT) process, which includes: selecting a random number N from the value range of the contention window, and decrementing the value of N by 1 in a subsequent channel detection process if the channel is detected to be idle, and keeping the value of N and starting an extended period process if the channel is detected to be busy; and determining that the channel is detected to be in the idle state when the value of N is 0; wherein, the value of N is decremented by 1 at the end of the extended period process.

In any of the foregoing technical solutions, optionally, the random access method further includes: before determining the channel detection mode for the random access channel according to the format of the random access preamble sequence, receiving correspondences between the formats of the random access preamble sequences and the channel detection modes which is transmitted by a base station, or reading correspondences between the formats of the random access preamble sequences and the channel detection modes which is stored by the terminal. The step of determining the format of the random access preamble sequence includes: receiving indication signaling transmitted by the base station, so as to determine the format of the random access preamble sequence according to the indication signaling.

In this technical solution, the base station may notify to the terminal the correspondences between the formats of the random access preamble sequences and the channel detection modes in advance, or the terminal has stored the correspondences between the formats of the random access preamble sequences and the channel detection modes. Therefore, when the terminal receives the format of the random access preamble sequence notified by the base station, a corresponding channel detection mode may be determined according to the correspondence and the format of the random access preamble sequence notified by the base station.

Optionally, the indication signaling includes a Radio Resource Control (RRC) signaling and/or a Downlink Control Information (DCI) signaling.

In any of the foregoing technical solutions, optionally, the random access method further includes: judging whether a reset signaling of a RRC connection transmitted by a base station is received; acquiring the random access preamble sequence indicated by the reset signaling when it is judged that the reset signaling of the RRC connection is received; and selecting randomly the random access preamble sequence, when it is judged that the reset signaling of the RRC connection is not received or that the random access preamble sequence is not indicated in the received reset signaling of the RRC connection.

According to the embodiments of the present disclosure, in a second aspect, it provides a random access device for an LTE system operating on an unlicensed frequency band, which includes: a first determining unit, a second determining unit, a channel detecting unit and a transmitting unit. The first determining unit is configured to determine a format of a random access preamble sequence. The second determining unit is configured to determine a channel detection mode for a random access channel according to the format of the random access preamble sequence. The channel detecting unit is configured to detect the random access channel according to the channel detection mode determined by the second determining unit. The transmitting unit is configured to transmit the random access preamble sequence via the random access channel when the channel detecting unit detects that the random access channel is in an idle state.

In this technical solution, since occupied time lengths are different for different formats of the random access preamble sequences, the channel detection mode is determined according to the format of the random access preamble sequence to detect the random access channel, so that different channel detection modes can be used for different formats of the random access preamble sequences, thereby ensuring a fairness for occupation of the random access channel when the different formats of the random access preamble sequences are used. Furthermore, a channel detection is also performed while the random access preamble sequence is transmitted, thereby preventing the LTE system operating on the unlicensed frequency band, from interfering with other systems (such as a Wi-Fi system) operating on the unlicensed frequency bands.

In the above technical solution, optionally, the format of the random access preamble sequence includes: a format 0, a format 1, a format 2, a format 3, and a format 4.

A priority of the channel detection mode corresponding to the format 4>a priority of the channel detection mode corresponding to the format 0>a priority of the channel detection mode corresponding to the format 1=a priority of the channel detection mode corresponding to the format 2>a priority of the channel detection mode corresponding to the format 3, with the priority of the channel detection mode representing a difficulty level for occupation of the random access channel by a terminal and/or a time length for occupation of the random access channel by the terminal.

The higher priority of the channel detection mode represents the easier occupation of the random access channel by the terminal and/or the shorter time length for the occupation of the random access channel by the terminal.

Optionally, as for the five formats of the random access preamble sequences, the size relationship thereof with respect to time lengths during which random channels are occupied by the terminal is: the format 4<the format 0<the format 1=the format 2<the format 3. It can be seen that in the format 4 of the random access preamble sequence, the time length during which the random access channel is occupied by the terminal is shortest. Therefore, to ensure the fairness for occupation of the channel for the different formats, a ranking order of the priorities for the signal detection modes can be the format 4>the format 0>the format 1=the format 2>the format 3.

Based on the above solution, the channel detection modes for different formats proposed by the present disclosure may be as follows.

In any of the foregoing technical solutions, optionally, the second determining unit is configured to: determining, if the format of the random access preamble sequence is the format 4, that the channel detection mode is not to perform a channel detection, and/or a maximum time length for occupation of the random access channel is two symbol lengths or 1 ms; or performing, if the format of the random access preamble sequence is the format 4, a channel detection process for a predetermined time length, and the predetermined time length is 16 us+M×9 us, wherein M=1 or 2, and/or a maximum time length for occupation of the random access channel is two symbol lengths or 1 ms.

In any of the foregoing technical solutions, optionally, the second determining unit is configured to: determining, if the format of the random access preamble sequence is a format 0, that the channel detection mode is not to perform a channel detection, and/or a maximum time length for occupation of the random access channel is 1 ms; or performing, if the format of the random access preamble sequence is a format 0, a channel detection process for a predetermined time length, and the predetermined time length is 16 us+M×9 us, wherein M=1 or 2, and/or a maximum time length for occupation of the random access channel is 1 ms.

In any of the foregoing technical solutions, optionally, the second determining unit is configured to: determining, if the format of the random access preamble sequence is a format 1 or a format 2, that a maximum time length for occupation of the random access channel is 2 ms, and/or performing a channel detection process by using the following parameters: a value range of a contention window being 3 to 7, and a time length of an extended period being 16 us+M×9 us, wherein M=1 or 2.

In any of the foregoing technical solutions, optionally, the second determining unit is configured to: determining, if the format of the random access preamble sequence is a format 3, that a maximum time length for occupation of the random access channel is 3 ms, and/or performing a channel detection process by using the following parameters: a value range of a contention window being 7 to 15, and a time length of an extended period being 16 us+M×9 us, wherein M=1 or M=2.

When the format of the random access preamble sequence is the format 1, the format 2 or the format 3, the channel detection process through the contention window and the extended period is a category 4 LBT process, which includes: selecting a random number N from the range of values of the contention window, and decrementing the value of N by 1 in a subsequent channel detection process if the channel is detected to be idle, and keeping the value of N and starting an extended period process if the channel is detected to be busy; and determining that the channel is detected to be in the idle state when the value of N is 0; wherein, the value of N is decremented by 1 at the end of the extended period process.

In any of the foregoing technical solutions, optionally, the random access device further includes: a receiving unit, configured to receive correspondences between the formats of the random access preamble sequences and the channel detection modes which is transmitted by a base station, before determining by the second determining unit the channel detection mode for the random access channel according to the format of the random access preamble sequence;

or a reading unit, configured to read correspondences between the formats of the random access preamble sequences and the channel detection modes which is stored by the terminal, before determining by the second determining unit the channel detection mode for the random access channel according to the format of the random access preamble sequence. The first determining unit is configured to: receive indication signaling transmitted by the base station, so as to determine the format of the random access preamble sequence according to the indication signaling.

In this technical solution, the base station may notify to the terminal the correspondences between the formats of the random access preamble sequences and the channel detection modes in advance, or the terminal has stored the correspondences between the formats of the random access preamble sequences and the channel detection modes. Therefore, when the terminal receives the format of the random access preamble sequence notified by the base station, a corresponding channel detection mode may be determined according to the correspondence and the format of the random access preamble sequence notified by the base station.

Optionally, the indication signaling includes a Radio Resource Control (RRC) signaling and/or a Downlink Control Information (DCI) signaling.

In any of the foregoing technical solutions, optionally, the random access device further includes: a judging unit, configured to judge whether a reset signaling of a RRC connection transmitted by a base station is received; an acquiring unit, configured to acquire the random access preamble sequence indicated by the reset signaling when the judging unit judges that the reset signaling of the RRC connection is received; and a selecting unit, configured to randomly select the random access preamble sequence, when the judging unit judges that the reset signaling of the RRC connection is not received or that the random access preamble sequence is not indicated in the received reset signaling of the RRC connection.

According to the embodiments of the present disclosure, in a third aspect, it provides a terminal, which includes: the random access device for the LTE system operating on the unlicensed frequency band according to any of the foregoing technical solutions.

According to the embodiments of the present disclosure, in a third aspect, it provides a non-transitory computer-readable storage medium storing computer-executable instructions, wherein the computer-executable instructions is configured to perform the random access method for the LTE system operating on the unlicensed frequency band according to any one of the foregoing technical solutions.

The technical solutions of the disclosure can prevent the LTE system operating on the unlicensed frequency band, from interfering with other systems (such as a Wi-Fi system) operating on the unlicensed frequency bands. Also, different channel detection modes can be used for the different formats of the random access preamble sequences, thereby ensuring fairness for occupation of the random access channel when the different formats of random access preamble sequences are used.

DETAILED DESCRIPTION

For a more clear understanding of above-mentioned objects, features, and advantages of the present disclosure, the present disclosure will be described below in conjunction with the accompanying drawings and optional embodiments. It should be noted that the embodiments of the present disclosure and the features in the embodiments can be combined with each other without conflict.

Details are set forth in the following description in order to provide a thorough understanding of the present disclosure. However, the present disclosure may also be implemented in other ways different from those described herein. Therefore, a scope of protection of the present disclosure is not limited by alternative embodiments disclosed below.

Figure 1:
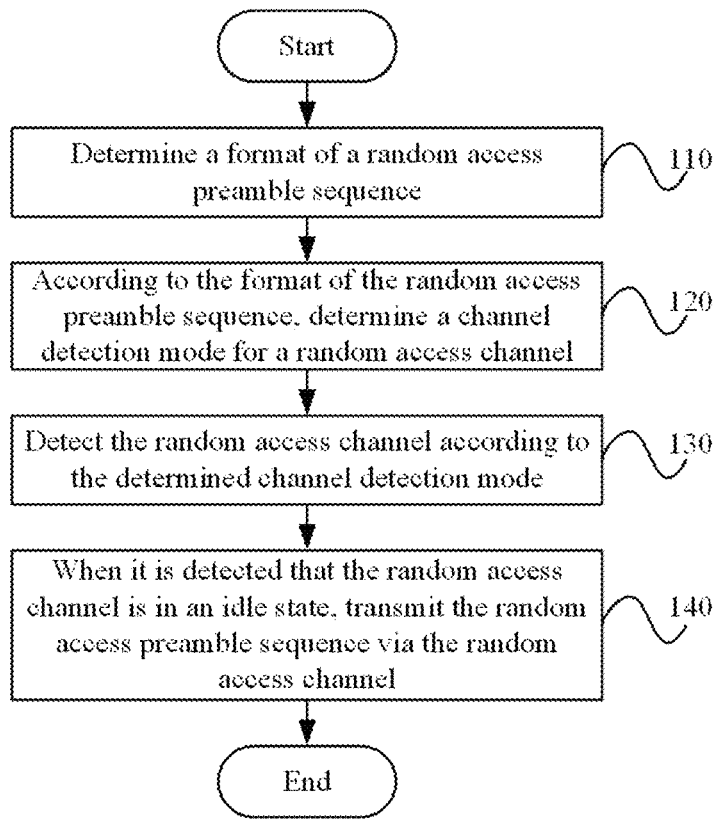
FIG. 1 shows a schematic flow chart of a random access method in a case where an LTE system operates on an unlicensed frequency band according to an embodiment of the present disclosure.

FIG. 1 shows a schematic flow chart of a random access method for an LTE system operating on an unlicensed frequency band according to an embodiment of the present disclosure.

As shown in FIG. 1, a random access method for the LTE system operating on the unlicensed frequency band according to an embodiment of the present disclosure includes:

In step 110, a terminal determines a format of a random access preamble sequence;

In step 120, according to the format of the random access preamble sequence, the terminal determines a channel detection mode for a random access channel;

In step 130, the terminal detects the random access channel according to the determined channel detection mode; and In step 140, when it is detected that the random access channel is in an idle state, the terminal transmits the random access preamble sequence via the random access channel.

In this technical solution, since occupied time lengths are different for different formats of the random access preamble sequences, the channel detection mode is determined according to the format of the random access preamble sequence to detect the random access channel, so that the different channel detection modes can be used for the different formats of the random access preamble sequences, thereby ensuring a fairness for occupation of the random access channel when the different formats of the random access preamble sequences are used. Furthermore, a channel detection is also performed while the random access preamble sequence is transmitted, thereby preventing the LTE system operating on the unlicensed frequency bands, from interfering with other systems (such as a Wi-Fi system) operating on the unlicensed frequency bands.

In the above technical solution, optionally, the format of the random access preamble sequence may include: a format 0, a format 1, a format 2, a format 3, and a format 4;

wherein a priority of the channel detection mode corresponding to the format 4>a priority of the channel detection mode corresponding to the format 0>a priority of the channel detection mode corresponding to the format 1=a priority of the channel detection mode corresponding to the format 2>a priority of the channel detection mode corresponding to the format 3, with the priority of the channel detection mode representing a difficulty level for occupation of the random access channel by a terminal and/or a time length for occupation of the random access channel by the terminal, and wherein, the higher priority of the channel detection mode represents the easier occupation of the random access channel by the terminal and/or the shorter time length for the occupation of the random access channel by the terminal.

Optionally, as for the five formats of the random access preamble sequences, the size relationship thereof with respect to time lengths during which random channels are occupied by the terminal is: the format 4<the format 0<the format 1=the format 2<the format 3. It can be seen that in the format 4 of the random access preamble sequence, the time length during which the random access channel is occupied by the terminal is shortest. Therefore, to ensure the fairness for occupation of the channels in different formats, a channel detection mode corresponding to the format 4 has the highest priority, followed by a channel detection mode corresponding to the format 0, and followed by channel detection modes corresponding to the format 1 and the format 2, and followed by a channel detection mode corresponding to the format 3.

Based on the above solution, the channel detection modes for different formats proposed by the present disclosure are as follows.

In any of the foregoing technical solutions, optionally, determining the channel detection mode for the random access channel according to the format of the random access preamble sequence may include steps in which:

if the format of the random access preamble sequence is the format 4, it is determined that the channel detection mode is not to perform a channel detection, and/or a maximum time length for occupation of the random access channel is two symbol lengths or 1 ms; or if the format of the random access preamble sequence is the format 4, a channel detection process is performed for a predetermined time length, and the predetermined time length is 16 us+M×9 us, where M=1 or M=2, and/or a maximum time length for occupation of the random access channel is two symbol lengths or 1 ms.

In any of the foregoing technical solutions, optionally, determining the channel detection mode for the random access channel according to the format of the random access preamble sequence includes steps in which:

if the format of the random access preamble sequence is a format 0, it is determined that the channel detection mode is not to perform a channel detection, and/or a maximum time length for occupation of the random access channel is 1 ms; or if the format of the random access preamble sequence is a format 0, a channel detection process is performed for a predetermined time length, and the predetermined time length is 16 us+M×9 us, where M=1 or M=2, and/or a maximum time length for occupation of the random access channel is 1 ms.

In any of the foregoing technical solutions, optionally, determining the channel detection mode for the random access channel according to the format of the random access preamble sequence includes steps in which:

if the format of the random access preamble sequence is a format 1 or a format 2, it is determined that a maximum time length for occupation of the random access channel is 2 ms, and/or a channel detection process is performed by using the following parameters: a value range of a contention window being 3 to 7, and a time length of an extended period being 16 us+M×9 us, where M=1 or M=2.

In any of the foregoing technical solutions, optionally, determining the channel detection mode for the random access channel according to the format of the random access preamble sequence includes steps in which:

if the format of the random access preamble sequence is a format 3, it is determined that a maximum time length for occupation of the random access channel is 3 ms, and/or a channel detection process is performed by using the following parameters:

a value range of a contention window being 7 to 15, and a time length of an extended period being 16 us+M×9 us, where M=1 or M=2.

When the format of the random access preamble sequence is the format 1, the format 2 or the format 3, the process of the channel detection through the contention window and the extended period is a category 4 Listen Before Talk (LBT) process, which includes:

a random number N is selected from the value range of the contention window, and in a subsequent channel detection process, if the channel is detected to be idle, the value of N is decremented by 1; if the channel is detected to be busy, the value of N is not changed, and an extended period process is started; when the N value is 0, it is determined that the channel is detected to be in the idle state; and at the end of the extended period process, the value of N is decremented by 1.

In any of the foregoing technical solutions, optionally, the method further includes steps in which:

before the step of determining the channel detection mode for the random access channel according to the format of the random access preamble sequence, a correspondence between the format of the random access preamble sequence and the channel detection mode which is transmitted by a base station is received, or a correspondence between the format of the random access preamble sequence and the channel detection mode which is stored by the terminal is read; and the step of determining the format of the random access preamble sequence includes a step in which: indication signaling transmitted by the base station is received, so as to determine the format of the random access preamble sequence according to the indication signaling.

In this technical solution, the base station may notify to the terminal the correspondences between the formats of the random access preamble sequences and the channel detection modes in advance, or the terminal has stored the correspondences between the formats of the random access preamble sequences and the channel detection modes. Therefore, when the terminal receives the format of the random access preamble sequence notified by the base station, a corresponding channel detection mode may be determined according to the correspondence and the format of the random access preamble sequence notified by the base station.

Optionally, the indication signaling includes a Radio Resource Control (RRC) signaling and/or a Downlink Control Information (DCI) signaling.

In any of the foregoing technical solutions, optionally, the method further includes steps in which:

it is judged whether a reset signaling of a RRC connection transmitted by the base station is received;

when it is judged that the reset signaling of the RRC connection is received, the random access preamble sequence indicated by the reset signaling is acquired;

when it is judged that the reset signaling of the RRC connection is not received, or it is judged that the random access preamble sequence is not indicated in the received reset signaling of the RRC connection, the random access preamble sequence is randomly selected.

Figure 2:
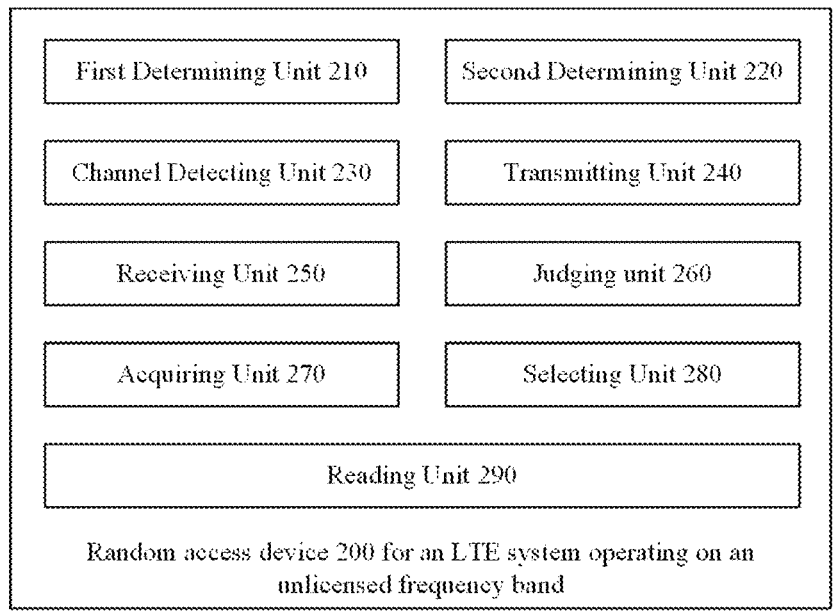
FIG. 2 shows a schematic block diagram of a random access device in the case where the LTE system operates on the unlicensed frequency band according to an embodiment of the present disclosure.

FIG. 2 shows a schematic block diagram of a random access device for the LTE system operating on the unlicensed frequency band according to an embodiment of the present disclosure.

As shown in FIG. 2, a random access device 200 for the LTE system operating on the unlicensed frequency band according to an embodiment of the present disclosure includes: a first determining unit 210, a second determining unit 220, a channel detecting unit 230, and transmitting unit 240.

The first determining unit 210 is configured to determine a format of a random access preamble sequence.

The second determining unit 220 is configured to determine a channel detection mode for a random access channel according to the format of the random access preamble sequence.

The channel detecting unit 230 is configured to detect the random access channel according to the channel detection mode determined by the second determining unit 204.

The transmitting unit 240 is configured to transmit the random access preamble sequence via the random access channel when the channel detecting unit 206 detects that the random access channel is in an idle state.

In this technical solution, since occupied time lengths are different for different formats of the random access preamble sequences, the channel detection mode is determined according to the format of the random access preamble sequence to detect the random access channel, so that different channel detection modes can be used for different formats of the random access preamble sequences, thereby ensuring a fairness for occupation of the random access channel when the different formats of the random access preamble sequences are used. Furthermore, a channel detection is also performed while the random access preamble sequence is transmitted, thereby preventing the LTE system operating on the unlicensed frequency band, from interfering with other systems (such as a Wi-Fi system) operating on the unlicensed frequency bands.

In the above technical solution, optionally, the format of the random access preamble sequence includes: a format 0, a format 1, a format 2, a format 3, and a format 4;

wherein a priority of the channel detection mode corresponding to the format 4>a priority of the channel detection mode corresponding to the format 0>a priority of the channel detection mode corresponding to the format 1=a priority of the channel detection mode corresponding to the format 2>a priority of the channel detection mode corresponding to the format 3, with the priority of the channel detection mode representing a difficulty level for occupation of the random access channel by a terminal and/or a time length for occupation of the random access channel by the terminal, wherein, the higher priority of the channel detection mode represents the easier occupation of the random access channel by the terminal and/or the shorter time length for the occupation of the random access channel by the terminal.

Optionally, as for the five formats of the random access preamble sequences, the size relationship thereof with respect to time lengths during which random channels are occupied by the terminal is: the format 4<the format 0<the format 1=the format 2<the format 3. It can be seen that in the format 4 of the random access preamble sequence, the time length during which the random access channel is occupied by the terminal is shortest. Therefore, to ensure the fairness for occupation of the channel for the different formats, a channel detection mode corresponding to the format 4 has the highest priority, followed by a channel detection mode corresponding to the format 0, and followed by channel detection modes corresponding to the format 1 and the format 2, and followed by a channel detection mode corresponding to the format 3.

Based on the above solution, the channel detection modes for different formats proposed by the present disclosure may be as follows.

In any of the foregoing technical solutions, optionally, the second determining unit 220 is configured to:

determine, if the format of the random access preamble sequence is the format 4, that the channel detection mode is not to perform a channel detection, and/or a maximum time length for occupation of the random access channel is two symbol lengths or 1 ms; or perform, if the format of the random access preamble sequence is the format 4, a channel detection process for a predetermined time length, and the predetermined time length is 16 us+M×9 us, where M=1 or M=2, and/or a maximum time length for occupation of the random access channel is two symbol lengths or 1 ms.

In any of the foregoing technical solutions, optionally, the second determining unit 220 is configured to:

determine, if the format of the random access preamble sequence is a format 0, that the channel detection mode is not to perform a channel detection, and/or a maximum time length for occupation of the random access channel is 1 ms; or perform, if the format of the random access preamble sequence is a format 0, a channel detection process for a predetermined time length, and the predetermined time length is 16 us+M×9 us, where M=1 or M=2, and/or a maximum time length for occupation of the random access channel is 1 ms.

In any of the foregoing technical solutions, optionally, the second determining unit 220 is configured to:

determine, if the format of the random access preamble sequence is a format 1 or a format 2, that a maximum time length for occupation of the random access channel is 2 ms, and/or perform a channel detection process by using the following parameters: a value range of a contention window being 3 to 7, and a time length of an extended period being 16 us+M×9 us, where M=1 or M=2.

In any of the foregoing technical solutions, optionally, the second determining unit 220 is configured to:

determine, if the format of the random access preamble sequence is a format 3, that a maximum time length for occupation of the random access channel is 3 ms, and/or perform a channel detection process by using the following parameters: a value range of a contention window being 7 to 15, and a time length of an extended period being 16 us+M×9 us, where M=1 or M=2.

When the format of the random access preamble sequence is the format 1, the format 2 or the format 3, the channel detection process through the contention window and the extended period is a category 4 LBT process, which includes:

a random number N is selected from the value range of of the contention window, and in a subsequent channel detection process, if the channel is detected to be idle, the value of N is decremented by 1; if the channel is detected to be busy, the value of N is not changed, and an extended period process is started; when the N value is 0, it is determined that the channel is detected to be in the idle state; at the end of the extended period process, the value of N is decremented by one.

In any of the foregoing technical solutions, optionally, the device further includes: a receiving unit 250, a reading unit 290.

the receiving unit 250 is configured to receive a correspondence between the format of the random access preamble sequence and the channel detection mode which is transmitted by a base station, before determining by the second determining unit 220 the channel detection mode for the random access channel according to the format of the random access preamble sequence; or the reading unit 290 is configured to read a correspondence between the format of the random access preamble sequence and the channel detection mode which is stored by the terminal, before determining by the second determining unit 220 the channel detection mode for the random access channel according to the format of the random access preamble sequence;

the first determining unit 210 is configured to: receive indication signaling transmitted by the base station, so as to determine the format of the random access preamble sequence according to the indication signaling.

In this technical solution, the base station may notify to the terminal the correspondences between the formats of the random access preamble sequences and the channel detection modes in advance, or the terminal has stored the correspondences between the formats of the random access preamble sequences and the channel detection modes. Therefore, when the terminal receives the format of the random access preamble sequence notified by the base station, a corresponding channel detection mode may be determined according to the correspondence and the format of the random access preamble sequence notified by the base station.

Optionally, the indication signaling includes a Radio Resource Control (RRC) signaling and/or a Downlink Control Information (DCI) signaling.

In any of the foregoing technical solutions, optionally, the device further includes:

a judging unit 260, configured to judge whether a reset signaling of a RRC connection transmitted by a base station is received;

an acquiring unit 270, configured to acquire the random access preamble sequence indicated by the reset signaling when the judging unit 260 judges that the reset signaling of the RRC connection is received; and a selecting unit 280, configured to randomly select the random access preamble sequence, when the judging unit 260 judges that the reset signaling of the RRC connection is not received or that the random access preamble sequence is not indicated in the received reset signaling of the RRC connection.

Figure 3:
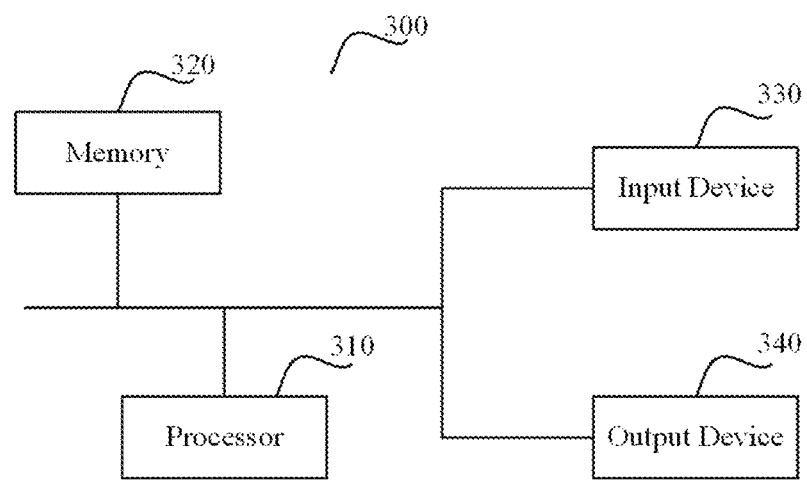
FIG. 3 shows a schematic block diagram of a terminal according to an embodiment of the present disclosure.

FIG. 3 shows a schematic block diagram of a terminal according to an embodiment of the present disclosure.

As shown in FIG. 3, the terminal 300 according to an embodiment of the present disclosure includes: one or more processors 310, such as the processor 310 as shown in FIG. 3; and a memory 320. The base station may further include: an input device 330 and an output device 340.

The processor 310, the memory 320, the input device 330, and the output device 340 in the terminal may be connected through a bus or other ways. In FIG. 3, the connections are made through the bus, for example.

As a non-transitory computer-readable storage medium, the memory 320 may be used to store software programs, computer-executable programs, and modules, such as the program instructions/modules (for example, the first determining unit 210, the second determining unit 220, the channel detecting unit 230 and the transmitting unit 240 as shown in FIG. 2) corresponding to the random access method for the LTE system operating on the unlicensed frequency band according to the embodiments of the present disclosure. The processor 320 executes various functional applications and data processing of a server by executing the software programs, the instructions, and the modules stored in the memory 320, so that the random access method for the LTE system operating on the unlicensed frequency band according to the above method embodiments is implemented.

The memory 320 may include a program storing area and a data storing area. The program storing area can store an operating system, and an application required for at least one function. The storage data area may store data created according to the use of the terminal, and the like. In addition, the memory 320 may include a high-speed random access memory, and may also include a non-transitory memory, such as at least one disk storage device, a flash memory device, or other non-volatile solid-state storage devices. In some embodiments, the memory 320 optionally includes memories remotely disposed with respect to the processor 310. These remote memories may be connected to the terminal device through a network. An example of such the network includes, but not limited to, Internet, an intranet, a local area network, a mobile communications network, and a combination thereof.

The input device 330 can be configured to receive input numerical or character information, and generate key signal inputs related to the user's settings and function control of the terminal. The output device 340 may include a display device such as a display screen.

The one or more modules are stored in the memory 320, and when being executed by the one or more processors 310, the random access method for the LTE system operating on the unlicensed frequency band according to the above method embodiments can be performed.

In summary, the technical solution of the present disclosure proposes a respective random access method for the PRACH under the LAA TDD. Optionally, I. As for the formats of the random access preamble sequences, the format used in the LAA system is a subset of five conventional formats. The selection priorities of the five conventional formats are as follows:

format 4>format 0>format 2>=format 1>format 3.

In the above five types of formats, since in the format 4, the time length for occupation of the random access channel by the terminal is shortest, and coverage area is the smallest and is about 2.1 km, the format 4 is suitable for a small cell, so that the format 4 is optimal; the next is the format 0 in which the time length of 1 ms is occupied; the next is the format 2 and the format 1 in which the time length of 2 ms is occupied; and the last is the format 3 in which the time length of 3 ms is occupied.

In the different formats, the priority of the channel detection mode corresponding to a format represents the ranking order of the format to be selected by the LAA. The higher priority corresponding to a format means that the LAA system more tends to select the format. In addition, the priority also represents a difficulty level for occupation of the PRACH by the terminal and/or a time length for occupation of the PRACH by the terminal. The higher priority of the channel detection mode corresponding to a certain format represents the easier occupation of the PRACH by the terminal and/or the shorter time length for occupation of the PRACH by the terminal.

II. The Listen Before Talk (LBT) Mechanism of the PRACH:

The first type: no channel detection is required, data is directly transmitted, and the maximum time length for occupation of the channel is 1 ms. It is applicable to channel access for higher PRACH priority, such as the format 0 and/or the format 4 of the random access preamble sequences. For the format 4, the maximum time length for occupation of the channel can also be 2 symbol lengths.

The second type: the channel detection time length is 16 us+M×9 us, and M is 1 or 2. If the channel is detected to be idle, the channel is occupied and the maximum time length for occupation of the channel is 1 ms. It is applicable to channel access for higher PRACH priority, such as the format 0 and/or the format 4 of the random access preamble sequences.

The third type: load-based category 4 LBT mechanism

Parameter 1 is used for the channel detection. The parameter 1 is: the minimum value of a contention window is 3 and the maximum value thereof is 7; a value of the extended period is 16 us+M×9 us, and M is 1 or 2; and the maximum time length for occupation of the channel is 2 ms. It is applicable to channel access for a third-ranked PRACH priority, such as the format 1 and the format 2 of the random access preamble sequences. Or, parameter 2 is used for the channel detection. The parameter 2 is: the minimum value of the contention window is 7 and the maximum value thereof is 15; the value of the extended period is 16 us+M×9 us, and M is 1 or 2, and the maximum time length for occupation of the channel is 3 ms. It is applicable to the channel access for a fourth-ranked PRACH priority, such as the format 3 of the random access preamble sequence.

According to the different formats of the random access preamble sequences corresponding to the multiple LBT mechanisms mentioned above, the correspondence as shown in Table 2 is summarized:

TABLE 2

| PRACH LBT Priority | Formats of Random Access Preamble Sequences | LBT Mechanism |
|---|---|---|
| 1 | Format 4 | No LBT or time length of channel detection is 16 us + M × 9 us (M = 1or 2) |
| 2 | Format 0 | No LBT or time length of channel detection is 16 us + M × 9 us (M = 1 or 2) |
| 3 | Format 1 or Format 2 | load-based category 4 LBT mechanism, use parameter 1 |
| 4 | Format 3 | load-based category 4 LBT mechanism, use parameter 2 |

III. Related Signaling

1. The base station notifies to the terminal the contents in Table 2 through RRC signaling, that is, notifies the terminal of the correspondences between the different formats of the random access preamble sequences and the LBT mechanisms.

2. The base station indicates the terminal to use the format of the random access preamble sequence through a RRC signaling and/or a DCI signaling.

3. If a serving cell (Scell) is switched or a Scell is added, indication information for the specific random access preamble sequence is given in the RRC connection reconfiguration signaling.

IV. UE-Side Operation

1. The UE receives the RRC signaling transmitted by the base station to acquire the correspondences between the different formats of random access preamble sequences and the LBT mechanisms.

2. The UE receives the RRC signaling and/or the DCI signaling transmitted by the base station to obtain the format of the random access preamble sequence indicated by the base station.

3. The UE performs a channel detection using the LBT mechanism corresponding to the format of the random access preamble sequence indicated by the base station.

4. If the UE receives the specific random access preamble sequence indicated in the RRC connection reconfiguration signaling transmitted by the base station, the UE transmits the specific random access preamble sequence when the channel is detected to be idle; if the UE does not receive the RRC connection reconfiguration signaling transmitted by the base station, or if there is no specific random access preamble sequence in the received RRC connection reconfiguration signaling, the UE randomly transmits one of the random access preamble sequences.

The above technical solution of the present application provides different LBT mechanisms and related parameters for the different formats of the random access preamble sequences. This ensures the fairness for the PRACH channel access when the terminal uses the different formats of the random access preamble sequences.

The technical solution of the present disclosure is described in detail above with reference to the drawings. The present disclosure proposes a random access scheme for an LTE system operating on an unlicensed frequency band, which can prevent the LTE system operating on the unlicensed frequency band, from interfering with other systems (such as a Wi-Fi system) operating on the unlicensed frequency bands. Also, the terminal uses different channel detection modes for the different formats of the random access preamble sequences, thereby ensuring fairness for occupation of the random access channel when the different formats of random access preamble sequences are used.

The foregoing descriptions are merely exemplary embodiments of the present disclosure and are not intended to limit the disclosure. For those skilled in the art, the disclosure may have various changes and modifications. Any modification, equivalent replacement, or improvement made within the spirit and principle of the present disclosure shall fall within the protection scope of the present disclosure.

INDUSTRIAL APPLICABILITY

The technical solution of the disclosure can prevent the LTE system operating on the unlicensed frequency band, from interfering with other systems operating on the unlicensed frequency bands. Also, different channel detection modes can be used for the different formats of the random access preamble sequences, thereby ensuring fairness for occupation of the random access channel when the different formats of random access preamble sequences are used.

What is claimed is:

1. A random access method for a Long Term Evolution (LTE) system operating on an unlicensed frequency band, comprising:
   determining a format of a random access preamble sequence;
   determining a channel detection mode for a random access channel according to the format of the random access preamble sequence;
   detecting the random access channel according to the determined channel detection mode; and
   transmitting the random access preamble sequence via the random access channel when it is detected that the random access channel is in an idle state,
   wherein the format of the random access preamble sequence is one of: a format 0, a format 1, a format 2, a format 3, or a format 4;
   wherein a priority of the channel detection mode corresponding to the format 4>a priority of the channel detection mode corresponding to the format 0>a priority of the channel detection mode corresponding to the format 1=a priority of the channel detection mode corresponding to the format 2>a priority of the channel detection mode corresponding to the format 3, with the priority of the channel detection mode representing a difficulty level for occupation of the random access channel by a terminal and/or a time length for occupation of the random access channel by the terminal, and wherein, among the channel detection modes corresponding to the format 0, the format 1, the format 2, the format 3 and the format 4, a channel detection mode having a higher priority is more easily occupied by the terminal and/or is occupied by the terminal for a shorter time length.

2. The random access method for the LTE system operating on the unlicensed frequency band according to claim 1, wherein determining the channel detection mode for the random access channel according to the format of the random access preamble sequence comprises:

determining, if the format of the random access preamble sequence is the format 4, that the channel detection mode is not to perform a channel detection, and/or a maximum time length for occupation of the random access channel is two symbol lengths or 1 ms; or performing, if the format of the random access preamble sequence is a format 4, a channel detection process for a predetermined time length, and the predetermined time length is 16 us+M×9 us, wherein M=1 or 2, and/or a maximum time length for occupation of the random access channel is two symbol lengths or 1 ms.

3. The random access method for the LTE system operating on the unlicensed frequency band according to claim 1, wherein determining the channel detection mode for the random access channel according to the format of the random access preamble sequence comprises:

determining, if the format of the random access preamble sequence is a format 0, that the channel detection mode is not to perform a channel detection, and/or a maximum time length for occupation of the random access channel is 1 ms; or performing, if the format of the random access preamble sequence is a format 0, a channel detection process for a predetermined time length, and the predetermined time length is 16 us+M×9 us, wherein M=1 or 2, and/or a maximum time length for occupation of the random access channel is 1 ms.

4. The random access method for the LTE system operating on the unlicensed frequency band according to claim 1, wherein determining the channel detection mode for the random access channel according to the format of the random access preamble sequence comprises:

determining, if the format of the random access preamble sequence is a format 1 or a format 2, that a maximum time length for occupation of the random access channel is 2 ms, and/or performing a channel detection process by using the following parameters:

a value range of a contention window being 3 to 7, and a time length of an extended period being 16 us+M×9 us, wherein M=1 or 2.

5. The random access method for the LTE system operating on the unlicensed frequency band according to claim 1, wherein determining the channel detection mode for the random access channel according to the format of the random access preamble sequence comprises:

determining, if the format of the random access preamble sequence is a format 3, that a maximum time length for occupation of the random access channel is 3 ms, and/or performing a channel detection process by using the following parameters:

a value range of a contention window being 7 to 15, and a time length of an extended period being 16 us+M×9 us, wherein M=1 or 2.

6. The random access method for the LTE system operating on the unlicensed frequency band according to claim 4, wherein the channel detection process is a category 4 Listen Before Talk (LBT) process, which comprises:

selecting a random number N from the value range of the contention window, and decrementing the value of N by 1 in a subsequent channel detection process if the channel is detected to be idle, and keeping the value of N and starting an extended period process if the channel is detected to be busy; and determining that the channel is detected to be in the idle state when the value of N is 0;

wherein, the value of N is decremented by 1 at the end of the extended period process.

7. The random access method for the LTE system operating on the unlicensed frequency band according to claim 1, further comprising: before determining the channel detection mode for the random access channel according to the format of the random access preamble sequence, receiving correspondences between formats of a plurality of random access preamble sequences and a plurality of channel detection modes which is transmitted by a base station, or reading correspondences between the formats of the random access preamble sequences and the channel detection modes which is stored by the terminal; and determining the format of the random access preamble sequence comprises: receiving indication signaling transmitted by the base station, so as to determine the format of the random access preamble sequence according to the indication signaling.

8. The random access method for the LTE system operating on the unlicensed frequency band according to claim 7, wherein the indication signaling comprises a Radio Resource Control (RRC) signaling and/or a Downlink Control Information (DCI) signaling.

9. The random access method for the LTE system operating on the unlicensed frequency band according to claim 1, further comprising:

judging whether a reset signaling of a RRC connection transmitted by a base station is received;

acquiring the random access preamble sequence indicated by the reset signaling when it is judged that the reset signaling of the RRC connection is received; and selecting randomly the random access preamble sequence, when it is judged that the reset signaling of the RRC connection is not received or that the random access preamble sequence is not indicated in the received reset signaling of the RRC connection.

10. A random access device for an LTE system operating on an unlicensed frequency band, comprising:

a processor; and a memory for storing executable instructions, wherein the processor, when executing the executable instructions, is configured to:

determine a format of a random access preamble sequence;

determine a channel detection mode for a random access channel according to the format of the random access preamble sequence;

detect the random access channel according to the channel detection mode determined by the second determining unit; and transmit the random access preamble sequence via the random access channel when it is detected that the random access channel is in an idle state, wherein the format of the random access preamble sequence is one of: a format 0, a format 1, a format 2, a format 3, or a format 4;

wherein a priority of the channel detection mode corresponding to the format 4>a priority of the channel detection mode corresponding to the format 0>a priority of the channel detection mode corresponding to the format 1=a priority of the channel detection mode corresponding to the format 2>a priority of the channel detection mode corresponding to the format 3, with the priority of the channel detection mode representing a difficulty level for occupation of the random access channel by a terminal and/or a time length for occupation of the random access channel by the terminal, and wherein, among the channel detection modes corresponding to the format 0, the format 1, the format 2, the format 3 and the format 4, a channel detection mode having a higher priority is more easily occupied by the terminal and/or is occupied by the terminal for a shorter time length.

11. The random access device for the LTE system operating on the unlicensed frequency band according to claim 10, wherein the processor, when executing the executable instructions, is configured to:

determine, if the format of the random access preamble sequence is the format 4, that the channel detection mode is not to perform a channel detection, and/or a maximum time length for occupation of the random access channel is two symbol lengths or 1 ms; or perform, if the format of the random access preamble sequence is format 4, a channel detection process for a predetermined time length, and the predetermined time length is 16 us+M×9 us, wherein M=1 or 2, and/or a maximum time length for occupation of the random access channel is two symbol lengths or 1 ms.

12. The random access device for the LTE system operating on the unlicensed frequency band according to claim 10, wherein the processor, when executing the executable instructions, is configured to:

determine, if the format of the random access preamble sequence is a format 0, that the channel detection mode is not to perform a channel detection, and/or a maximum time length for occupation of the random access channel is 1 ms; or perform, if the format of the random access preamble sequence is a format 0, a channel detection process for a predetermined time length, and the predetermined time length is 16 us+M×9 us, wherein M=1 or 2, and/or a maximum time length for occupation of the random access channel is 1 ms.

13. The random access device for the LTE system operating on the unlicensed frequency band according to claim 10, wherein the processor, when executing the executable instructions, is configured to:

determine, if the format of the random access preamble sequence is a format 1 or a format 2, that a maximum time length for occupation of the random access channel is 2 ms, and/or performing a channel detection process by using the following parameters:

a value range of a contention window being 3 to 7, and a time length of an extended period being 16 us+M×9 us, wherein M=1 or 2.

14. The random access device for the LTE system operating on the unlicensed frequency band according to claim 10, wherein the processor, when executing the executable instructions, is configured to:

determine, if the format of the random access preamble sequence is a format 3, that a maximum time length for occupation of the random access channel is 3 ms, and/or performing a channel detection process by using the following parameters:

a value range of a contention window being 7 to 15, and a time length of an extended period being 16 us+M×9 us, wherein M=1 or M=2.

15. The random access device for the LTE system operating on the unlicensed frequency band according to claim 13, wherein the channel detection process is a category 4 LBT process, which comprises:

selecting a random number N from the range of values of the contention window, and decrementing the value of N by 1 in a subsequent channel detection process if the channel is detected to be idle, and keeping the value of N and starting an extended period process if the channel is detected to be busy; and determining that the channel is detected to be in the idle state when the value of N is 0;

wherein, the value of N is decremented by 1 at the end of the extended period process.

16. The random access device for the LTE system operating on the unlicensed frequency band according to claim 10: wherein the processor, when executing the executable instructions, is further configured to:

receive correspondences between formats of a plurality of random access preamble sequences and a plurality of channel detection modes which is transmitted by a base station, before determining the channel detection mode for the random access channel according to the format of the random access preamble sequence; or read correspondences between the formats of the random access preamble sequences and the channel detection modes which is stored by the terminal, before determining the channel detection mode for the random access channel according to the format of the random access preamble sequence; and the processor, when executing the executable instructions, is configured to: receive indication signaling transmitted by the base station, so as to determine the format of the random access preamble sequence according to the indication signaling.

17. The random access device for the LTE system operating on the unlicensed frequency band according to claim 10, wherein the processor, when executing the executable instructions, is further configured to:

judge whether a reset signaling of a RRC connection transmitted by a base station is received;

acquire the random access preamble sequence indicated by the reset signaling when it is judged that the reset signaling of the RRC connection is received; and randomly select the random access preamble sequence, when it is judged that the reset signaling of the RRC connection is not received or that the random access preamble sequence is not indicated in the received reset signaling of the RRC connection.

18. A terminal, comprising: the random access device for the LTE system operating on the unlicensed frequency band according to claim 10.

* * * * *